United States Patent
Nishida

(10) Patent No.: US 10,848,633 B2
(45) Date of Patent: Nov. 24, 2020

(54) ENTERING NON-EXECUTION MODE WHEN NO IDENTIFIABLE NEARBY TERMINAL EXISTS

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/436,021

(22) Filed: Jun. 10, 2019

(65) Prior Publication Data
US 2019/0387117 A1 Dec. 19, 2019

(30) Foreign Application Priority Data
Jun. 13, 2018 (JP) .................. 2018-112873

(51) Int. Cl.
*G06F 3/12* (2006.01)
*H04N 1/00* (2006.01)

(52) U.S. Cl.
CPC ....... *H04N 1/00901* (2013.01); *G06F 3/1221* (2013.01); *G06F 3/1236* (2013.01); *G06F 3/1292* (2013.01); *H04N 1/00907* (2013.01)

(58) Field of Classification Search
CPC ............ H04N 1/00901; H04N 1/00907; G06F 3/1236; G06F 3/1292; G06F 3/1221; G05B 2219/33
See application file for complete search history.

(56) References Cited

U.S. PATENT DOCUMENTS

| 2012/0129512 A1 | 5/2012 | Kanai et al. | |
| 2014/0148216 A1 | 5/2014 | Kanai et al. | |
| 2014/0192692 A1* | 7/2014 | Stark | H04W 52/0209 370/311 |
| 2014/0347057 A1* | 11/2014 | Oh | G08C 17/02 324/426 |
| 2016/0274637 A1* | 9/2016 | Kang | G06F 9/4406 |
| 2016/0379206 A1* | 12/2016 | Lee | G06Q 20/3278 705/40 |

FOREIGN PATENT DOCUMENTS

JP 2012-199599 A 10/2012

* cited by examiner

*Primary Examiner* — Juan M Guillermety
(74) *Attorney, Agent, or Firm* — Workman Nydegger

(57) ABSTRACT

An information processing apparatus includes a first wireless communication unit that establishes first wireless communication with a terminal apparatus by a first wireless communication method, a second wireless communication unit that establishes, by a second wireless communication method, third wireless communication with an access point of a wireless communication network that establishes second wireless communication with the terminal apparatus by the second wireless communication method, and a control unit that controls a mode based on whether or not driving power is supplied from a battery.

9 Claims, 4 Drawing Sheets

FIG. 2

| | 200 | | |
|---|---|---|---|
| | SSID | | |

| ITEM NUMBER | SSID |
|---|---|
| 1 | abc3 |
| 2 | xyz4 |
| 3 | pqr7 |
| ⋮ | ⋮ |

ENTERING NON-EXECUTION MODE WHEN NO IDENTIFIABLE NEARBY TERMINAL EXISTS

The present application is based on, and claims priority from JP Application Serial Number 2018-112873, filed Jun. 13, 2018, the disclosure of which is hereby incorporated by reference herein in its entirety.

BACKGROUND

1. Technical Field

The present disclosure relates to an information processing apparatus.

2. Related Art

Since a mobile device is driven by a battery, power saving is required strictly. For that reason, various power saving technologies have been proposed.

In JP-A-2012-199599, an example of power saving technology is disclosed. A master unit of a cordless telephone set described in JP-A-2012-199599 lowers a transmission power of a wireless signal to be transmitted to a slave unit of the cordless telephone set to a level at which no communication error occurs when power supply from the outside stops, (for example, see paragraphs 0012, 0013, and the like of JP-A-2012-199599).

However, in recent years, the mobile device has become more sophisticated and has higher power consumption than conventional devices, and thus, further power saving of the mobile devices is required.

Particularly, since a wireless connection process (for example, a scan process in which the mobile device scans a service set identifier (SSID) of an access point (AP) around (which may be called periphery) the mobile device performed by the mobile device for wireless connection with another electronic device is executed continuously, power consumption is large. For that reason, in the mobile device, there was a problem of how to reduce power consumption due to a wireless connection process.

SUMMARY

According to an aspect of the present disclosure, there is provided an information processing apparatus including a first wireless communication unit that establishes first wireless communication with a terminal apparatus by a first wireless communication method, a second wireless communication unit that establishes, by a second wireless communication method, third wireless communication with an access point of a wireless communication network that establishes second wireless communication with the terminal apparatus by the second wireless communication method, and a control unit that determines whether or not driving power is supplied from a battery, determines whether or not the third wireless communication with the access point is established by the second wireless communication method, and, when it is determined that a condition that the driving power is supplied from the battery and the third wireless communication with the access point is not established by the second wireless communication method is satisfied, shifts from an execution mode in which a predetermined wireless connection process in the second wireless communication method is executed to a non-execution mode in which the predetermined wireless connection process is not executed.

According to another aspect of the present disclosure, there is provided an information processing apparatus including a first wireless communication unit that establishes first wireless communication with a terminal apparatus by a first wireless communication method, a second wireless communication unit that establishes fourth wireless communication with the terminal apparatus by a second wireless communication method, and a control unit that determines whether or not driving power is supplied from a battery, determines whether or not a connection request for the fourth wireless communication is received from the terminal apparatus, and, when it is determined that a condition that the driving power is supplied from the battery and the connection request for the fourth wireless communication is not received from the terminal apparatus is satisfied, shifts from an execution mode in which a predetermined wireless connection process in the second wireless communication method is executed to a non-execution mode in which the predetermined wireless connection process is not executed.

In the information processing apparatus, the information processing apparatus may further include a storing unit that stores identification information of the terminal apparatus connected to the information processing apparatus in a wireless manner by the second wireless communication method in the past, and the control unit may determine whether or not the terminal apparatus connected to the information processing apparatus in a wireless manner by the second wireless communication method in the past exists around the information processing apparatus based on the identification information of the terminal apparatus stored in the storing unit and, when it is determined that the condition is satisfied and a condition that the terminal apparatus connected to the information processing apparatus in a wireless manner by the second wireless communication method in the past does not exist around the information processing apparatus is satisfied, may shift to the non-execution mode.

According to still another aspect of the present disclosure, there is provided an information processing apparatus including a first wireless communication unit that establishes first wireless communication with a terminal apparatus by a first wireless communication method, a second wireless communication unit that performs at least one of establishing, by a second wireless communication method, third wireless communication with an access point of a wireless communication network that establishes second wireless communication with the terminal apparatus by the second wireless communication method and establishing fourth wireless communication with the terminal apparatus by the second wireless communication method, a storing unit that stores identification information of the terminal apparatus connected to the information processing apparatus in a wireless manner by the second wireless communication method in the past, and a control unit that determines whether or not driving power is supplied from a battery, determines whether or not the terminal apparatus to the information processing apparatus connected in a wireless manner by the second wireless communication method in the past exists around the information processing apparatus based on the identification information of the terminal apparatus stored in the storing unit, and, when it is determined that a condition that the driving power is supplied from the battery and the terminal apparatus connected to the information processing apparatus in a wireless manner by the second wireless communication method in the past does not exist around the information processing apparatus is satisfied, shifts from an execution mode in which a predetermined wireless connection process is executed in the second wireless communication method to a non-execution mode in which the predetermined wireless connection process is not executed.

In the information processing apparatus, the control unit may determine whether or not the terminal apparatus is activated when it is determined that the condition that the terminal apparatus to the information processing apparatus connected in a wireless manner by the second wireless communication method in the past exists around the information processing apparatus is satisfied, and may shift to the non-execution mode when it is determined that a condition that the terminal apparatus is not activated is satisfied.

In the information processing apparatus, the control unit may determine whether a predetermined wireless communication function of the second wireless communication method in the terminal apparatus is ON or OFF when it is determined that the condition that the terminal apparatus is not activated is satisfied, and may shift to the non-execution mode when it is determined that the condition that the predetermined wireless communication function of the second wireless communication method in the terminal apparatus is OFF is satisfied.

BRIEF DESCRIPTION OF THE DRAWINGS

FIG. 2 is a diagram schematically illustrating a beacon according to the embodiment of the present disclosure.

FIG. 3 is a diagram illustrating a configuration of an SSID list according to the embodiment of the present disclosure.

DESCRIPTION OF EXEMPLARY EMBODIMENTS

Hereinafter, an embodiment of the present disclosure will be described with reference to the drawings.
Printing System
FIG. 1 is a diagram illustrating a schematic configuration of a printing system 1 according to an embodiment of the present disclosure.

The printing system 1 includes a printer 10 and a terminal apparatus 20.

Figure 1:
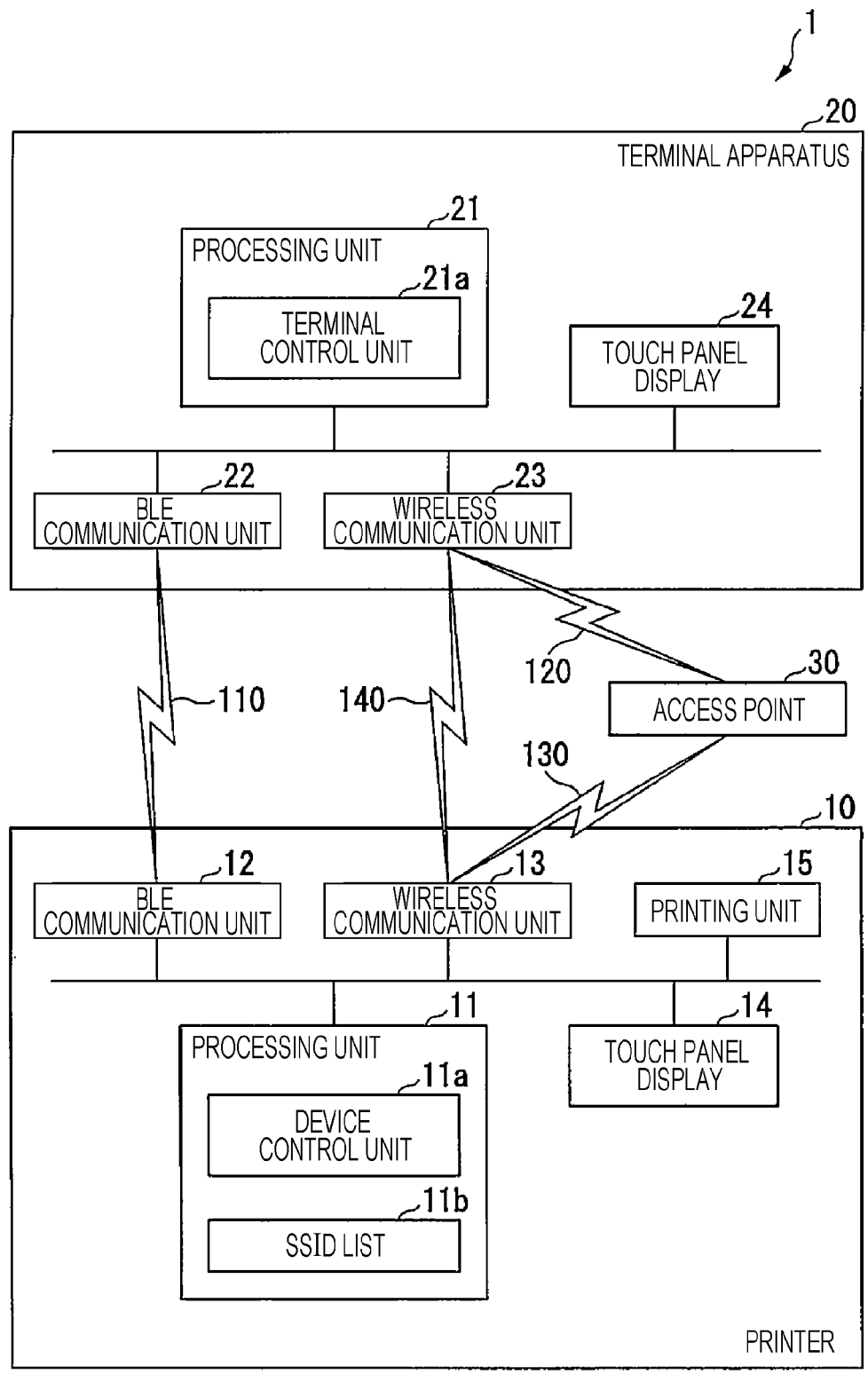
FIG. 1 is a diagram illustrating a schematic configuration of a printing system according to an embodiment of the present disclosure.

In FIG. 1, an access point 30 of a wireless communication network is illustrated. In this embodiment, the wireless communication network is a wireless local area network (LAN) in which wireless communication is performed by a wireless communication method conforming to the Wi-Fi (registered trademark) standard.

The printer 10 and the terminal apparatus 20 establish first wireless communication 110 by a wireless communication method conforming to the Bluetooth (registered trademark) low energy (BLE) standard.

The terminal apparatus 20 establishes second wireless communication 120 with an access point 30 of the wireless LAN by the wireless communication method conforming to the Wi-Fi (registered trademark) standard.

The printer 10 establishes third wireless communication 130 with the wireless LAN access point 30 by the wireless communication method conforming to the Wi-Fi (registered trademark) standard.

The printer 10 and the terminal apparatus 20 establish fourth wireless communication 140 by the wireless communication method conforming to the Wi-Fi (registered trademark) standard. In this embodiment, the fourth wireless communication 140 is direct communication by a direct communication connection between the printer 10 and the terminal apparatus 20, and is realized by the printer 10 performing the same operation as that of the access point 30 in a pseudo manner.

The access point 30 functions as a wireless LAN router. In FIG. 1, although one access point 30 is illustrated, a plurality of access points 30 may exist around the printer 10 and the terminal apparatus 20.

For example, the access point 30 may be regarded as being included in the printing system 1 or may be regarded as not being included in the printing system 1.

Here, in this embodiment, a case where the printer 10 is a mobile device is illustrated, but is not limited thereto.

In this embodiment, a case where the access point 30 is a mobile device is illustrated, but is not limited thereto. In this embodiment, each of the printer 10 and the access point 30 can be carried by a user.

As an example, the same user can carry both the printer 10 and the access point 30 at the same time and can use the printer 10 and the access point 30 at any place while putting both of these power supplies in an ON state.

In this embodiment, the terminal apparatus 20 is a mobile device that can be carried by the user.

In this embodiment, in the printer 10 having a wireless function, communication with the terminal apparatus 20 is performed through the access point 30 for example, by being wirelessly connected to the external access point 30.

In this case, the terminal apparatus 20 is wirelessly connected to the access point 30. In the following description, for convenience of description, such a wireless connection is referred to as an Infra connection. In this embodiment, in the printer 10 having the wireless function, for example, the printer 10 performs the same operation as that of the access point 30 in a pseudo manner, so that the printer 10 directly communicates with the terminal apparatus 20. In this case, the terminal apparatus 20 is wirelessly connected to the printer 10. In the following description, for convenience of description, such a wireless connection is referred to as direct communication connection.
Printer
A configuration of the printer 10 will be described with reference to FIG. 1.

The printer 10 includes a processing unit 11, a BLE communication unit 12, a wireless communication unit 13 that performs wireless communication according to the Wi-Fi (registered trademark) standard, a touch panel display 14, and a printing unit 15.

The BLE communication unit 12 is a communication interface (communication I/F).

The BLE communication unit 12 performs signal transmission or signal reception with a communication partner by performing wireless communication with the communication partner according to the BLE standard.

According to the BLE standard, the BLE communication unit 12 can perform wireless communication with a communication partner with a lower power and a shorter distance than the wireless communication unit 13 according to the Wi-Fi (registered trademark) standard.

For example, the BLE communication unit 12 may be configured as a chip or a module for performing wireless communication conforming to the BLE standard.

The wireless communication unit 13 is a communication interface (communication I/F).

The wireless communication unit 13 performs wireless communication with a communication partner according to the Wi-Fi (registered trademark) standard, thereby performing signal transmission or signal reception with the communication partner.

The wireless communication unit 13 may be configured as, for example, a chip or a module for performing wireless communication conforming to the Wi-Fi (registered trademark) standard.

The touch panel display 14 is a user interface serving as both a display capable of displaying various types of information and a touch panel for detecting an operation such as a touch on the display.

Here, in this embodiment, the user interface for outputting information to the user (person) and the user interface for inputting information from the user are integrated, but as another example, these user interfaces may be separately provided.

Further, as a form for outputting information, for example, in addition to output by display, output by sound or the like may be used.

The printing unit 15 prints an image. The printing unit 15 includes, for example, a transport mechanism (not illustrated) for transporting a printing medium, a printing mechanism (not illustrated) for printing the image on the printing medium. As the printing medium, for example, paper or the like is used.

The processing unit 11 executes various processes.

The processing unit 11 can include, for example, a processor such as a central processing unit (CPU) and a memory, and can execute a program recorded (may be denoted by stored) in the memory. As the memory, for example, a read only memory (ROM), a random access memory (RAM), and the like are used, and an electrically erasable programmable read only memory (EEPROM) may be used.

The processing unit 11 includes a device control unit 11a.

Here, the processing unit 11 realizes the function of the device control unit 11a by executing firmware recorded in the memory. The firmware is a type of program.

The device control unit 11a controls operations of the BLE communication unit 12, the wireless communication unit 13, the touch panel display 14, and the printing unit 15. For example, the device control unit 11a displays an image on the touch panel display 14 and receives an input from the user to the touch panel display 14. The device control unit 11a executes image processing on the image indicated by print data based on the print data, and controls the printing unit 15 to print the image on the print medium. The device control unit 11a controls the BLE communication unit 12 to establish the first wireless communication 110 with the terminal apparatus 20. Further, the device control unit 11a controls the wireless communication unit 13 to establish the third wireless communication 130 with the access point 30.

The device control unit 11a controls the wireless communication unit 13 to perform the same operation as that of the access point 30 in a pseudo manner. With this configuration, the device control unit 11a establishes the fourth wireless communication 140 with the terminal apparatus 20.

The processing unit 11 stores an SSID list 11b in the memory. The SSID list 11b is a list of SSIDs acquired by the wireless communication unit 13 by searching for a wireless LAN of a wireless communication method conforming to the Wi-Fi (registered trademark) standard.

Terminal Apparatus

A configuration of the terminal apparatus 20 will be described with reference to FIG. 1.

The terminal apparatus 20 includes a processing unit 21, a BLE communication unit 22, a wireless communication unit 23 that performs wireless communication according to the Wi-Fi (registered trademark) standard, and a touch panel display 24.

The BLE communication unit 22 is a communication interface (communication I/F).

The BLE communication unit 22 performs signal transmission or signal reception with a communication partner by performing wireless communication with the communication partner according to the BLE standard.

According to the BLE standard, the BLE communication unit 22 can perform wireless communication with the communication partner with a lower power and a shorter distance than the wireless communication unit 23 according to the Wi-Fi (registered trademark) standard.

For example, the BLE communication unit 22 may be configured as a chip or a module for performing wireless communication according to the BLE standard.

The wireless communication unit 23 is a communication interface (communication I/F).

The wireless communication unit 23 performs wireless communication with the communication partner according to the Wi-Fi (registered trademark) standard, thereby performing signal transmission or signal reception with the communication partner.

The wireless communication unit 23 may be configured as, for example, a chip or a module for performing wireless communication conforming to the Wi-Fi (registered trademark) standard.

The touch panel display 24 is a user interface serving as both a display capable of displaying various types of information and a touch panel for detecting an operation such as a touch on the display.

Here, in this embodiment, the user interface for outputting information to the user (person) and the user interface for inputting information from the user are integrated, but as another example, these user interfaces may be separately provided.

Further, as a form for outputting information, for example, in addition to output by display, output by sound or the like may be used.

The processing unit 21 executes various processes.

The processing unit 21 can include, for example, a processor such as the CPU and a memory, and can execute a program recorded in the memory. As the memory, for example, the ROM, the RAM, and the like are used, and the EEPROM may be used.

The processing unit 21 includes a terminal control unit 21a.

Here, the processing unit 21 realizes the function of the terminal control unit 21a by executing an application recorded in the memory. The application is a type of program and may be referred to as an application.

The terminal control unit 21a controls operations of the BLE communication unit 22, the wireless communication unit 23, and the touch panel display 24. For example, the terminal control unit 21a displays an image on the touch panel display 24 and receives an input from the user to the touch panel display 24. The terminal control unit 21a controls the BLE communication unit 22 to establish the first wireless communication 110 with the printer 10. Further, the terminal control unit 21a controls the wireless communication unit 23 to establish the second wireless communication 120 with the access point 30.

The terminal control unit 21a controls the wireless communication unit 23 to establish the fourth wireless communication 140 with the printer 10. In this case, the terminal control unit 21a performs wireless communication with the function of the pseudo access point of the printer 10, for example, by the same operation as the operation of wirelessly communicating with the access point 30.

The terminal apparatus 20, for example, may be a mobile communication terminal apparatus such as a smart phone or tablet computer (tablet PC), or may be a stationary personal computer or the like.

Access Point

The access point 30 wirelessly transmits a predetermined beacon according to the Wi-Fi (registered trademark) standard. As the timing of wirelessly transmitting the beacon, for example, the periodic timing is used. The beacon is wirelessly transmitted, for example, by broadcast. The access point 30 wirelessly transmits the beacon including the SSID of the access point 30. The beacon may be wirelessly transmitted using, for example, a packet.

The printer 10 receives the beacon wirelessly transmitted from the access point 30, and performs wireless communication with the access point 30 using the SSID included in the beacon.

He The terminal apparatus 20 receives the beacon wirelessly transmitted from the access point 30, and performs wireless communication with the access point 30 using the SSID included in the beacon.

Pseudo Access Point in Printer

The printer 10 wirelessly transmits a predetermined beacon as a function of a pseudo access point according to the Wi-Fi (registered trademark) standard. As the timing of wirelessly transmitting the beacon, for example, the periodic timing is used. Also, the beacon is wirelessly transmitted, for example, by broadcast. The printer 10 wirelessly transmits the beacon including the SSID of the printer 10.

The terminal apparatus 20 receives the beacon wirelessly transmitted from the printer 10, and performs wireless communication with the printer 10 using the SSID included in the beacon.

Creation of SSID List

FIG. 2 is a diagram schematically illustrating a beacon 200 according to the embodiment of the present disclosure.

The beacon 200 is a beacon based on the Wi-Fi (registered trademark) standard.

The beacon 200 is defined by the Wi-Fi (registered trademark) standard, and the SSID is described as an item of network information in a part in which information conforming to a determined format is described. The access point 30 wirelessly transmits the Wi-Fi (registered trademark) beacon 200 periodically by broadcast.

Further, in this embodiment, when operating as a pseudo access point, the printer 10 wirelessly transmits the Wi-Fi (registered trademark) beacon 200 periodically by broadcast.

In the printer 10, the wireless communication unit 13 receives the beacon 200 wirelessly transmitted from the access point 30 by the broadcast. Then, the device control unit 11a acquires the SSID included in the beacon 200, which is received by the wireless communication unit 13, from the wireless communication unit 13. The device control unit 11a writes the SSID acquired from the wireless communication unit 13 in the SSID list 11b to be stored. In this case, when the SSID acquired from the wireless communication unit 13 is already included in the SSID list 11b, the device control unit 11a does not write the same SSID in duplicate in the SSID list 11b.

FIG. 3 is a diagram illustrating a configuration of the SSID list 11b according to the embodiment of the present disclosure.

The device control unit 11a controls the wireless communication unit 13 to receive the beacon 200 at a constant period, for example, and updates the SSID list 11b based on the reception result of the beacon 200. With this configuration, the SSID list 11b is updated at the constant period.

Here, among the access points 30, there may be a so-called "stealth access point (AP)" as a so-called common name where the value of the SSID is NULL or the length of the SSID is 0. As the SSIDs included in the beacon 200 broadcasted from the stealth AP, the following two examples are included.

Example 1 of SSID of Stealth AP

When the value of the SSID is NULL, for example, when the length of the SSID is 4 (SSID Length=4), the value of the SSID becomes NULL (¥0) by the length of the SSID (SSID='¥0¥0¥0¥0').

Example 2 of SSID of Stealth AP

When the length of the SSID is 0 (SSID Length=0), the value of the SSID becomes "SSID=' '".

The device control unit 11a determines whether the SSID acquired from the wireless communication unit 13 corresponds to the example 1 (the SSID value is NULL) of the SSID of the stealth AP or the example 2 (the SSID length is 0) of the stealth AP, and, when it is determined that the SSID corresponds to the example 1 or example 2 of the SSID of the stealth AP, writes information of "the value of the SSID is NULL" or "the length of the SSID is 0" as the SSID in the SSID list 11b.

In the example of FIG. 3, the SSID list 11b stores item numbers and SSIDs in association with each other.

As a specific example, an SSID of "abc3" is stored in a field with the item number of 1. An SSID of "xyz4" is stored in a field with the item number of 2.

Wireless Communication by BLE

The printer 10 and the terminal apparatus 20 perform direct communication by the function of BLE.

In the printer 10, the device control unit 11a wirelessly transmits a beacon of BLE at periodic timing by the BLE communication unit 12. The periodic timing may be any timing. The beacon may be wirelessly transmitted using, for example, a packet.

In the terminal apparatus 20, when the beacon of BLE wirelessly transmitted from the printer 10 is received by the BLE communication unit 22, the terminal control unit 21a wirelessly transmits a response signal of BLE including identification information of its own apparatus (the terminal apparatus 20). As the identification information, any information may be used, for example, information of a media access control (MAC) address may be used.

In the printer 10, the device control unit 11a receives the response signal of BLE wirelessly transmitted from the terminal apparatus 20 by the BLE communication unit 12, and acquires the identification information included in the received response signal of BLE. In the printer 10, the device control unit 11a can identify the terminal apparatus 20 based on the acquired identification information of the terminal apparatus 20, and can specify information on the terminal apparatus 20.

Here, various kinds of information may be used as the information on the terminal apparatus 20, for example, information specifying whether or not the terminal apparatus 20 has performed printing by the printer 10 in the past is used. In the printer 10, for example, the device control unit 11a records the identification information of the terminal apparatus 20 that has performed printing by the printer 10 in the past, and based on this recorded information, can specify the terminal apparatus 20 that has performed printing by the printer 10 in the past. Specifically, in the printer 10, the device control unit 11a collates the identification information of the terminal apparatus 20 included in the response signal received from the terminal apparatus 20 with the recorded information and, when it is determined that the identification information is included in the recorded information, the device control unit 11a determines that the terminal apparatus 20 has performed printing by the printer 10 in the past. On the other hand, when it is determined that the identification information is not included in the recorded information, the device control unit 11a determines that the terminal apparatus 20 has not performed printing by the printer 10 in the past. The recorded information is recorded, for example, in the memory of the processing unit 11.

In this embodiment, it is predicted that the terminal apparatus 20 that has performed printing by the printer 10 in the past has a high possibility of wirelessly transmitting data to be printed to the printer 10 in order to perform printing by the printer 10 again, and on the other hand, it is predicted that the terminal apparatus 20 that has not performed printing by the printer 10 in the past has a low possibility of wirelessly transmitting data to be printed to the printer 10 in order to perform printing by the printer 10.

In this embodiment, information indicating whether or not the terminal apparatus 20 is activated is included in the response signal of BLE wirelessly transmitted from the terminal apparatus 20, by terminal control unit 21a. In the printer 10, the device control unit 11a can determine whether or not the terminal apparatus 20 is activated based on the information.

In this embodiment, information indicating whether or not the function of the wireless communication unit 23 of the terminal apparatus 20 is in an ON state is included in the response signal of BLE wirelessly transmitted from the terminal apparatus 20, by the terminal control unit 21a. In the printer 10, the device control unit 11a can determine whether or not the function of the wireless communication unit 23 of the terminal apparatus 20 is in an ON state based on the information.

Wireless Communication by Wi-Fi (Registered Trademark)

In this embodiment, the wireless communication unit 13 of the printer 10 and the wireless communication unit 23 of the terminal apparatus 20 are directly or indirectly connected in a wireless manner.

In the printer 10, the device control unit 11a performs wireless connection with the access point 30 by the wireless communication unit 13 on a one-to-one basis. In this case, the printer 10 is wirelessly connected to one or two or more terminal apparatuses 20 through one access point 30.

In the printer 10, the device control unit 11a is wirelessly connected to one or two or more terminal apparatuses 20 directly when the printer 10 becomes a pseudo access point by the wireless communication unit 13.

In the printer 10, the device control unit 11a receives the beacon 200 wirelessly transmitted from the access point 30 by the wireless communication unit 13. Then, in the printer 10, the device control unit 11a wirelessly transmits a request signal for the Infra connection to the access point 30 by using the information of the SSID included in the received beacon 200. With this configuration, the printer 10 and the access point 30 are wirelessly connected to each other.

In the terminal apparatus 20, the terminal control unit 21a receives the beacon 200 wirelessly transmitted from the access point 30 by the wireless communication unit 23. Then, in the terminal apparatus 20, the terminal control unit 21a wirelessly transmits a request signal for wireless connection to the access point 30 by using the information of the SSID included in the received beacon 200. With this configuration, the terminal apparatus 20 and the access point 30 are wirelessly connected to each other.

When the printer 10 operates as a pseudo access point, in the terminal apparatus 20, the terminal control unit 21a receives the beacon wirelessly transmitted from the access point by the wireless communication unit 23. Then, in the terminal apparatus 20, the terminal control unit 21a wirelessly transmits a request signal for wireless connection to the access point by using the information of the SSID included in the received beacon. With this configuration, the terminal apparatus 20 and the access point (here, the printer 10) are wirelessly connected to each other. In this case, the printer 10 is identified by the SSID.

In this embodiment, in the terminal apparatus 20, the wireless communication unit 23 wirelessly transmits data to be printed.

In this embodiment, in the printer 10, the wireless communication unit 13 receives data to be printed and the printing unit 15 prints an image corresponding to the received data to be printed.

In this case, when the printer 10 and the access point 30 are wirelessly connected and the terminal apparatus 20 and the access point 30 are wirelessly connected by the Infra connection, data to be printed wirelessly transmitted from the terminal apparatus 20 is received by the printer 10 through the access point 30.

In this case, when the printer 10 which has become pseudo access point and the terminal apparatus 20 are wirelessly connected by the direct communication connection, data to be printed wirelessly transmitted from the terminal apparatus 20 is directly received by the printer 10.

In general, wireless communication by the Wi-Fi is more suitable for communication of large capacity data like data to be printed than wireless communication by the BLE.

Here, when the printer 10 and the terminal apparatus 20 are indirectly wirelessly connected by the Infra connection or directly wirelessly connected by the direct communication connection and data to be printed is wirelessly transmitted from the terminal apparatus 20 to the printer 10, in the terminal apparatus 20, the terminal control unit 21a transmits the identification information of its own apparatus (the terminal apparatus 20) to the printer 10 by the wireless communication unit 23. In the printer 10, the device control unit 11a records the identification information of the terminal apparatus 20 received by the wireless communication unit 13 in a predetermined memory. With this configuration, in the printer 10, the device control unit 11a can manage the identification information of the terminal apparatus 20 that has performed printing by the printer 10 in the past.

As a memory for recording the identification information, for example, an internal memory of the printer 10 may be used, or an external memory may be used. As the internal memory of the printer 10, for example, a memory of the processing unit 11 may be used.

Operation Performed in Printing System

In this embodiment, an operation related to the Infra connection and an operation related to the direct communication connection by Wi-Fi (registered trademark) will be described.

In this embodiment, the operation related to the Infra connection and an operation related to the direct communication connection will be described.

In this embodiment, when the operation related to the Infra connection is in an ON state, the printer 10 performs a process of searching for the access point 30 to be connected in a wireless manner.

In this embodiment, when the operation related to the direct communication connection is in an ON state, the printer 10 performs a process of searching for the terminal apparatus 20 to be connected in a wireless manner.

For example, there may be a case where both the operation related to the Infra connection and the operation related to the direct communication connection are in an ON state.

Further, for example, there may be a case where the same terminal apparatus 20 is managed at the same time in both the operation related to the Infra connection and the operation related to the direct communication connection.

Operation Related to Infrastructure Connection

Figure 4:
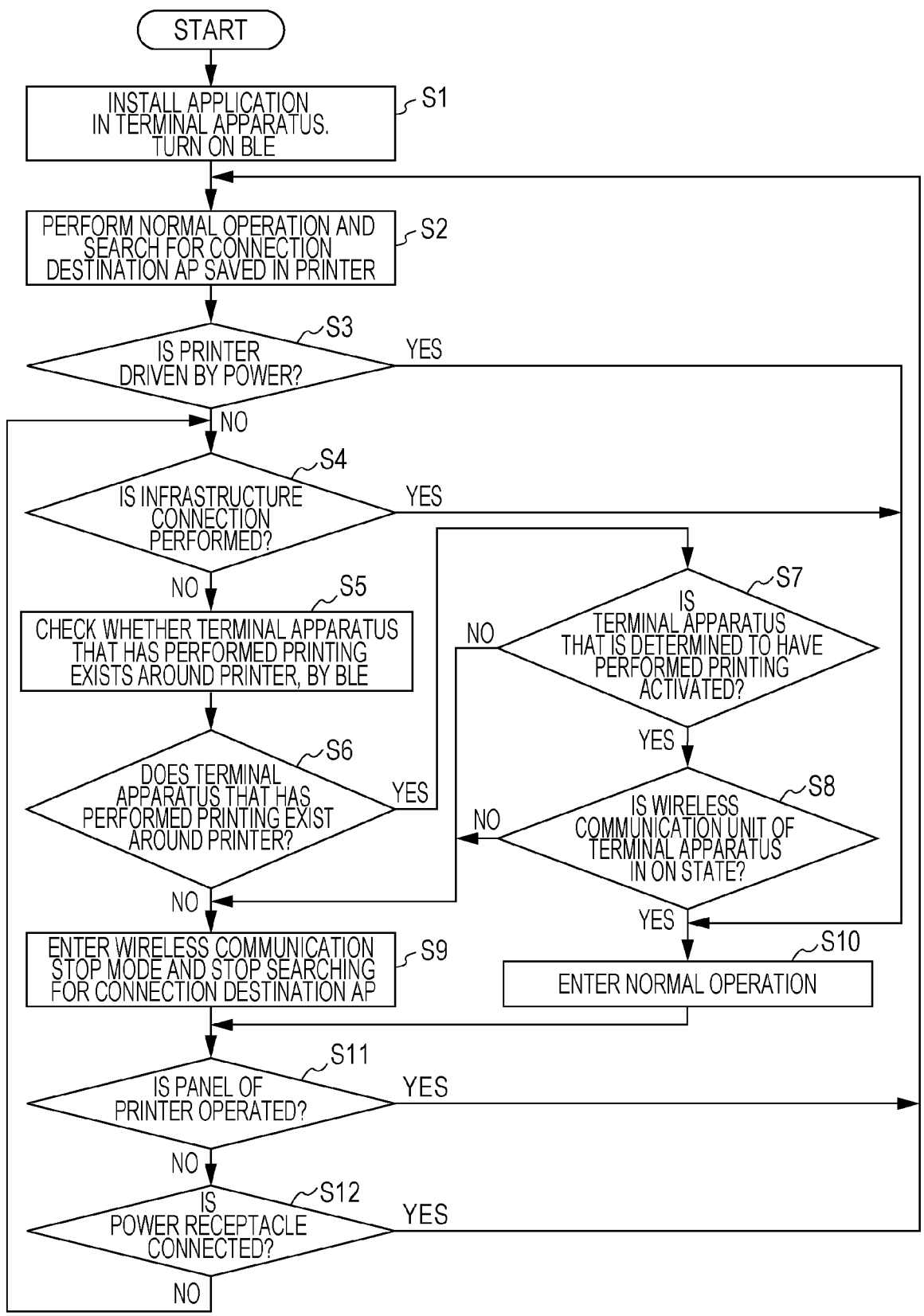
FIG. 4 is a diagram illustrating an example of a procedure of processing relating to Infra connection performed in the printing system according to the embodiment of the present disclosure.

FIG. 4 is a diagram illustrating an example of a procedure of a process relating to the Infra connection performed in the printing system 1 according to the embodiment of the present disclosure.

In this example, a case where a mode (for convenience of description, it is also referred to as a "normal operation mode") in which a normal operation is performed and a mode (for convenience of description, it is also referred to as a "wireless communication stop mode") in which a predetermined function related to wireless communication is stopped are set to be switchable, in the printer 10, is exemplified.

Step S1

The user installs a predetermined application in the terminal apparatus 20. The application is an application that realizes the function of the terminal control unit 21a, and may be a dedicated application, for example.

In addition, the user operates the touch panel display 24 of the terminal apparatus 20 to put the function of BLE in the terminal apparatus 20 in an ON state. In the initial state of the terminal apparatus 20, when the function of BLE in the terminal apparatus 20 is in the ON state, the state is left as it is.

Then, the process proceeds to step S2.

Here, installation of the application is performed in advance, for example.

The installation of the application may be performed once at the beginning, for example, and thereafter may be updated.

The installation of the application may be automatically performed by a predetermined apparatus, for example.

Further, when the terminal apparatus 20 initially has a function of a predetermined application, there is no need to install the application after the installation.

Further, the function of the predetermined application includes a function of wirelessly transmitting the matters as to whether the function of the wireless communication unit 23 that performs wireless communication by Wi-Fi (registered trademark) is in an ON state or OFF state to the printer 10 by the terminal control unit 21a, in the terminal apparatus 20.

The process of putting the function of BLE in the terminal apparatus 20 in an ON state may be automatically performed by the terminal apparatus 20, for example.

Step S2

In the printer 10, the device control unit 11a performs various operations while the power supply is in an ON state, thereby performing the normal operation. In the normal operation of the printer 10, the device control unit 11a searches for a connection destination AP storing the SSID in the SSID list 11b of the printer 10 and establishes an Infra connection with the connection destination AP. Then, the device control unit 11a proceeds to a process of step S3.

Such an Infra connection process is a process for detecting the access point 30 by determining whether or not the access point 30 corresponding to the connection destination AP exists around the printer 10, for example, by a scan process and is performed automatically by the printer 10. Such a scan process may be performed only for a predetermined time, for example, and when the connection destination AP is not found at the predetermined time, the scan process may be ended. An arbitrary time may be used as the predetermined time, for example, approximately 1 minute to 3 minutes may be used.

In this example, in the printer 10, the function of BLE is held in the ON state, and the function of the Wi-Fi (registered trademark) is held in the ON state.

Here, the connection destination AP indicates the access point 30 which is a destination to which the printer 10 is to be connected.

In the printer 10, for example, the processing unit 11 records information specifying the connection destination AP. For example, when the printer 10 is already connected to the connection destination AP, a process of newly searching for the connection destination AP may not be performed. For example, in the printer 10, when the power source is switched from the OFF state to the ON state, the connection destination AP is searched for and connected to the printer 10, and thereafter, when the connection with the connection destination AP is disconnected, or when the connection is intended to be shifted to another connection destination AP, a new connection destination AP is searched.

In this example, the case where the power supply of the printer 10 is in an ON state is illustrated, but as another example, in a case where the power supply of the printer 10 is in an OFF state, for example, when the printer 10 is used, the power supply of the printer 10 is switched from the OFF state to the ON state by the user operating the touch panel display 14.

Step S3

In the printer 10, the device control unit 11a determines whether or not the printer 10 is being driven by power.

As a result of this determination, in the printer 10, when it is determined that the printer 10 is being driven by power (YES in step S3), the device control unit 11a proceeds to a process of step S10.

On the other hand, as a result of this determination, in the printer 10, when it is determined that the printer 10 is not being driven by power (NO in step S3), the device control unit 11a proceeds to a process of step S4.

Here, in this embodiment, being driven by power indicates that the device (for example, the printer 10) is driven by power supplied from a so-called power receptacle. In this case, except for the power receptacle and the like, power is continuously supplied from the power receptacle.

On the other hand, in this embodiment, not being driven by power indicates that the apparatus (for example, the printer 10) is driven by the power supplied from a battery.

In this case, power is supplied from the battery until the power accumulated in the battery becomes low enough to be unable to be supplied.

As such, the printer 10 according to this embodiment is in one of a state of being driven by power and a state of not being driven by power (in this embodiment, a state of being driven by a battery).

In this embodiment, in the printer 10, the device control unit 11a is configured to be able to determine whether or not the printer 10 is being driven by power, that is, whether power is supplied from the power receptacle, or to determine whether the printer 10 is in a state where power is supplied from the battery.

For example, in the printer 10, the device control unit 11a may perform a predetermined process for power saving when it is determined that the printer 10 is not being driven by power (in this example, being driven by the battery).

Step S4

In the printer 10, the device control unit 11a determines whether or not the Infra connection can be performed.

As a result of this determination, in the printer 10, when it is determined that the Infra connection can be performed (YES in step S4), the device control unit 11a proceeds to the process of step S10.

On the other hand, as a result of this determination, in the printer 10, when it is determined that Infra connection cannot be performed (NO in step S4), the device control unit 11a proceeds to a process of step S5.

Here, in the printer 10, for example, when the power supply of the access point 30 (that is, the connection destination AP) which is targeted for the Infra connection is in an ON state, it is possible to establish the Infra connection with the access point 30. On the other hand, when the power supply of the access point 30 which is targeted for the Infra connection is an OFF state, it is not possible to establish Infra connection with the access point 30.

Step S5

In the printer 10, the device control unit 11a checks whether or not a terminal apparatus 20 that has performed printing exists around the printer 10 by wireless communication by BLE. Specifically, in the printer 10, the device control unit 11a performs wireless communication with the terminal apparatus 20 existing around the printer 10 by the BLE communication unit 12 and checks whether or not the terminal apparatus 20 has performed printing by the printer 10. Then, the device control unit 11a proceeds to a process of step S6.

Here, a space around the printer 10 indicates, for example, a range in which the wireless communication can be performed by the printer 10. Here, the wireless communication is wireless communication by the BLE.

As the terminal apparatus 20 that has performed printing, for example, the terminal apparatus 20 that has performed printing by the printer 10 even once in the past may be used, or the terminal apparatus 20 that has performed printing by the printer 10 for a predetermined period from the present to the past may be used. The predetermined period may be an arbitrary period, for example, it may be set to a predetermined numerical value, or a period after the printer 10 turns from the previous OFF state to the ON state may be used.

Step S6

In the printer 10, the device control unit 11a determines whether or not the terminal apparatus 20 that has performed printing exists around the printer 10.

As a result of this determination, in the printer 10, when it is determined that the terminal apparatus 20 that has performed printing exists around the printer 10 (YES in step S6), the device control unit 11a proceeds to a process of step S7.

On the other hand, as a result of this determination, in the printer 10, when it is that the terminal apparatus 20 that has been printed does not exist around the printer 10 (NO in step S6), the device control unit 11a proceeds to a process of step S9.

Step S7

In the printer 10, the device control unit 11a determines whether or not the terminal apparatus 20 that is determined to have performed printing is activated by wireless communication by the BLE.

As a result of this determination, in the printer 10, when it is determined that the terminal apparatus 20 that is determined to have performed printing is activated (YES in step S7), the device control unit 11a proceeds to a process of step S8.

On the other hand, as a result of this determination, in the printer 10, when it is determined that the terminal apparatus 20 that is determined to have performed printing is not activated (NO in step S7), the device control unit 11a proceeds to a process of step S9.

Here, in a case where a plurality of terminal apparatuses 20 determined to have performed printing exist, for example, in the printer 10, the device control unit 11a determines whether or not each of the terminal apparatuses 20 determined to have performed printing, and when it is determined that one or more terminal apparatuses 20 are activated, the device control unit 11a proceeds to a process of step S8. On the other hand, when all the terminal apparatuses 20 are not activated, the device control unit 11a proceeds to the process of step S9.

In this embodiment, the state in which the terminal apparatus 20 is activated means a state in which the power supply is in an ON state and the terminal apparatus 20 is not in the wireless communication stop mode, and indicates a state in which the terminal apparatus 20 is in the normal operation mode.

Step S8

In the printer 10, the device control unit 11a determines, by wireless communication by the BLE, whether or not the function of the wireless communication unit 23 of the terminal apparatus 20 determined to have performed printing and determined to be activated is in an ON state. In this embodiment, the function of the wireless communication unit 23 is a function of wireless communication by the Wi-Fi (registered trademark).

As a result of this determination, in the printer 10, in a case where it is determined that the function of the wireless communication unit 23 of the terminal apparatus 20 determined to have performed printing and determined to be activated is in the ON state (YES in Step S8), the device control unit 11a proceeds to the process of step S10.

On the other hand, as a result of this determination, in the printer 10, in a case where the device control unit 11a determines that the function of the wireless communication unit 23 of the terminal apparatus 20 determined to have performed printing and determined to be activated is not in the ON state (that is, it is in the OFF state) (NO in Step S8), the device control unit 11a proceeds to the process of step S9.

Step S9

In the printer 10, the device control unit 11a enters the wireless communication stop mode and stops searching for the connection destination AP. Then, the device control unit 11a proceeds to a process of step S11.

Here, the wireless communication stop mode is a state in which wireless communication by the wireless communication unit 13 is stopped. In this example, the wireless communication stop mode is a state in which wireless communication relating to at least the Infra connection is stopped, and specifically, a state in which the function of the scan process for detecting the access point 30 corresponding to information of the connection destination AP set in the printer 10 is turned OFF.

In this example, in the printer 10, the BLE function is also held in the ON state even in the wireless communication stop mode.

Here, in this example, the wireless communication stop mode in which the wireless communication by the wireless communication unit 13 is stopped is used, but a predetermined operation other than wireless communication by the wireless communication unit 13 may also be stopped.

As an example, instead of the wireless communication stop mode, a mode (sleep mode) in which a sleep state is set may be used. In the sleep mode, the wireless communication by the wireless communication unit 13 is stopped, and the other predetermined operation is also stopped. For example, in the sleep mode, the general function in the terminal apparatus 20 is stopped, but in this example, the function of BLE is held in the ON state.

In this example, as an example, in the wireless communication stop mode, all the functions of wireless communication by the wireless communication unit 13 are stopped, but as another example, a part of the functions of wireless communication by the wireless communication unit 13 may be stopped.

Step S10

In the printer 10, the device control unit 11a performs a normal operation. Then, the device control unit 11a proceeds to step S11.

Step S11

In the printer 10, the device control unit 11a determines whether or not the touch panel display 14 is operated by the user (step S11).

As a result of this determination, in the printer 10, when it is determined that the touch panel display 14 is operated by the user (YES in step S11), the device control unit 11a proceeds to the process of step S2. In this example, in this case, in the printer 10, the device control unit 11a shifts to a mode (normal operation mode) for performing a normal operation when the printer 10 is in the wireless communication stop mode.

On the other hand, as a result of this determination, in the printer 10, when it is determined that the touch panel display 14 is not operated by the user (NO in step S11), the device control unit 11a proceeds to step S12.

Step S12

In the printer 10, the device control unit 11a determines whether or not the so-called power receptacle is connected and being driven by power is established (step S12).

As a result of this determination, in the printer 10, when it is determined that the so-called power receptacle is connected and being driven by power is established (YES in step S12), the device control unit 11a proceeds to the process of step S2. In this example, in this case, in the printer 10, the device control unit 11a shifts to the mode (normal operation mode) for performing the normal operation when the printer 10 is in the wireless communication stop mode.

On the other hand, as a result of this determination, in the printer 10, when it is determined that the so-called power receptacle is not connected and being driven by power is not established (NO in step S12), the device control unit 11a proceeds to the process of step S4. In the present example, in this case, in the printer 10, the device control unit 11a shifts to the mode (normal operation mode) for performing the normal operation when the printer 10 is in the wireless communication stop mode.

Here, as a modification example of the process flow illustrated in FIG. 4, the process of step S4 may be arranged immediately before the process of step S9, instead of the process sequence illustrated in FIG. 4. Specifically, in the example illustrated in FIG. 4, when the determination result in step S3 is NO, the device control unit 11a proceeds to the process of step S5, when the determination result in step S6, in step S7, or in step S8 is NO, the device control unit 11a proceeds to step S4, when the determination result in step S4 is NO, the device control unit 11a proceeds to step S9, when the determination result in step S4 is YES, the device control unit 11a proceeds to step S10, and when the determination result in step S12 is NO, the device control unit 11a proceeds to step S5.

In the example of FIG. 4, the normal operation mode and the wireless communication stop mode are illustrated as the mode of the printer 10, but other modes may be used.

In the example of FIG. 4, although illustration of a process of ending a flow of a series of processes is omitted, for example, in a case where the power supply of the printer 10 is turned off, the process flow illustrated in FIG. 4 is ended once.

Operation Relating to Direct Communication Connection by Wi-Fi (Registered Trademark)

Figure 5:
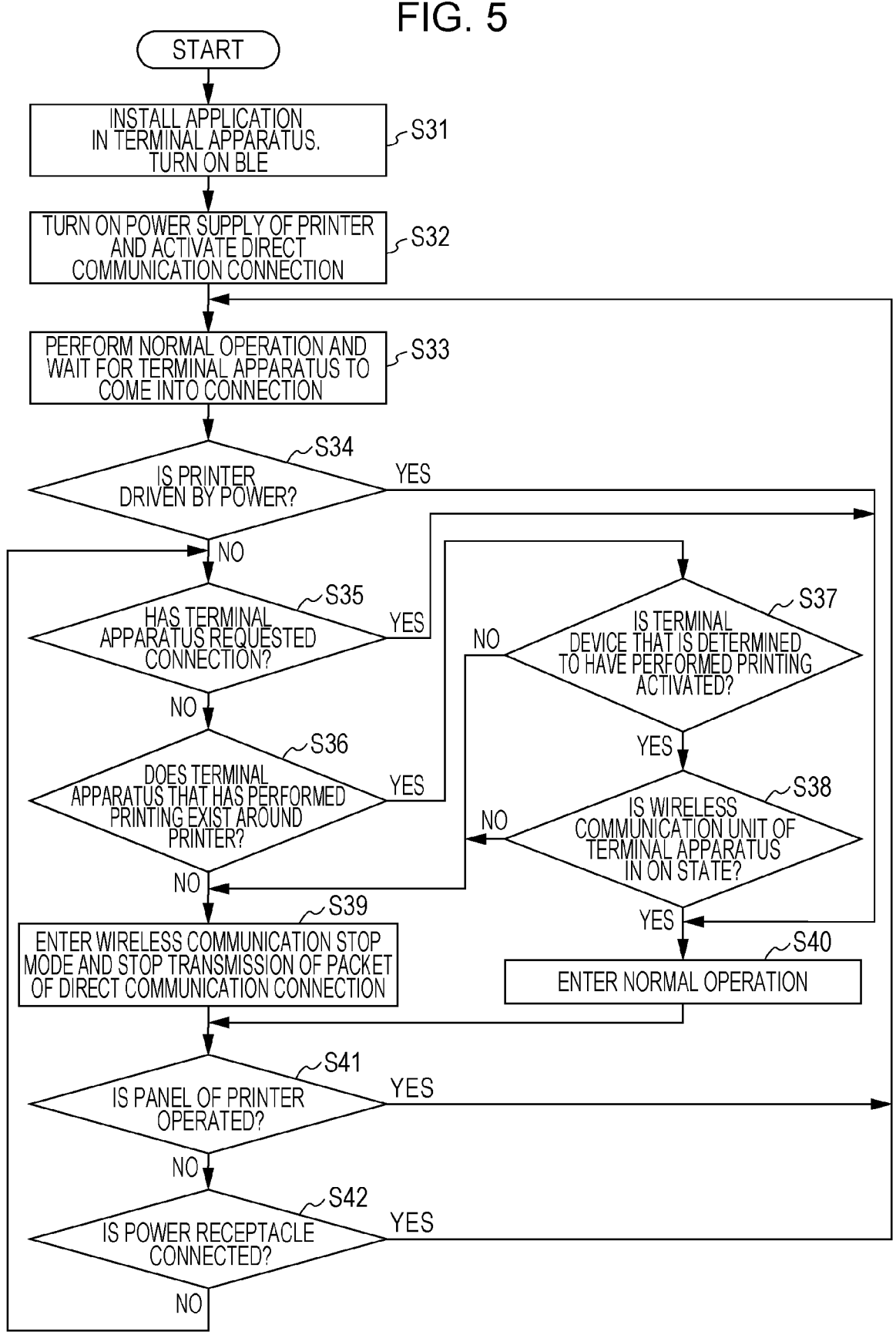
FIG. 5 is a diagram illustrating an example of a procedure of processing relating to direct communication connection performed in the printing system according to the embodiment of the present disclosure.

FIG. 5 is a flowchart illustrating an example of a procedure of a process relating to the direct communication connection performed in the printing system 1 according to the embodiment of the present disclosure.

In this example, a case where a mode (for convenience of description, it is also referred to as a "normal operation mode") in which a normal operation is performed and a mode (for convenience of description, it is also referred to as a "wireless communication stop mode") in which a predetermined function related to wireless communication is stopped are set to be switchable, in the printer 10, is exemplified.

Step S31

The user installs a predetermined application in the terminal apparatus 20. The application is an application that realizes the function of the terminal control unit 21a, and may be a dedicated application, for example.

In addition, the user operates the touch panel display 24 of the terminal apparatus 20 to put the function of BLE in the terminal apparatus 20 in an ON state. In the initial state of the terminal apparatus 20, when the function of BLE in the terminal apparatus 20 is in the ON state, the state is left as it is.

Then, the process proceeds to step S32.

Details of the process of step S31 are, for example, similar to those of the process of step S1 in the example of FIG. 4.

Step S32

The user operates the touch panel display 14 of the printer 10 to switch the power supply of the printer 10 from the OFF state to the ON state. In a case where the power supply of the printer 10 is already in the ON state, the printer 10 is left as it is.

The user operates the touch panel display 14 of the printer 10 to activate the function of direct communication connection by Wi-Fi (registered trademark) in the printer 10 to the ON state. In an initial state of the printer 10, in a case where the direct communication connection function of the printer 10 is in the ON state, the printer 10 is left as it is.

Here, in this example, in the printer 10, the function of BLE is held in an ON state and the function of Wi-Fi (registered trademark) is in an ON state.

Then, the process proceeds to step S33.

Step S33

In the printer 10, in a state where the power supply is ON, the device control unit 11a performs various operations to perform the normal operation. In the normal operation of the printer 10, the device control unit 11a performs an operation of a pseudo access point and waits for the terminal apparatus 20 to connect to its own apparatus (the printer 10).

Then, the device control unit 11a proceeds to a process of step S34.

Here, in this embodiment, the terminal apparatus 20 automatically searches for the access point 30 or the pseudo access point (in this case, the printer 10) existing around its own apparatus (the terminal apparatus 20), and makes a connection request to the searched access point 30 or the pseudo access point.

Step S34

In the printer 10, the device control unit 11a determines whether or not the printer 10 is being driven by power.

As a result of this determination, in the printer 10, when it is determined that the printer 10 is being driven by power (YES in step S34), the device control unit 11a proceeds to a process of step S40.

On the other hand, as a result of this determination, in the printer 10, when it is determined that the printer 10 is not being driven by power (NO in step S34), the device control unit 11a proceeds to a process of step S35.

Details of the process of step S34 are similar to those of the process of step S3 in the example of FIG. 4.

Step S35

In the printer 10, the device control unit 11a determines whether or not the terminal apparatus 20 has come to connect with the printer 10, that is, whether or not the terminal apparatus 20 has requested connection with the printer 10.

As a result of this determination, in the printer 10, when it is determined that the terminal apparatus 20 has come to connect with the printer 10 (YES in step S35), the device control unit 11a proceeds to a process of step S40.

On the other hand, as a result of this determination, in the printer 10, when it is determined that the terminal apparatus 20 has not come to connect with the printer 10 (NO in step S35), the device control unit 11a proceeds to a process of step S36.

Here, in the printer 10, when it is determined that the wireless communication unit 13 has received a request signal for direct communication connection wirelessly transmitted from the terminal apparatus 20 to the printer 10, the device control unit 11a determines that the terminal apparatus 20 has come to connect with the printer 10.

In this case, the terminal apparatus 20 wirelessly transmits the request signal for direct communication connection to the printer 10.

Step S36

In the printer 10, the device control unit 11a checks whether or not the terminal apparatus 20 that has performed printing exists around the printer 10 by wireless communication by the BLE. Specifically, in the printer 10, the device control unit 11a performs wireless communication with the terminal apparatus 20 existing around the printer 10 by the BLE communication unit 12 and checks whether or not the terminal apparatus 20 has performed printing by the printer 10.

In the printer 10, the device control unit 11a determines whether or not the terminal apparatus 20 that has performed printing exists around the printer 10.

As a result of this determination, in the printer 10, when it is determined that the terminal apparatus 20 that has performed printing exists around the printer 10 (YES in step S36), the device control unit 11a proceeds to a process of step S37.

On the other hand, as a result of this determination, in the printer 10, when it is determined that the terminal apparatus 20 that has performed printing does not exist around the printer 10 (NO in step S36), the device control unit 11a proceeds to a process of step S39.

As Details of the process of step S36 are similar to those of the process of step S5 and the process of step S6 in the example of FIG. 4.

Step S37

In the printer 10, the device control unit 11a determines whether or not the terminal apparatus 20 that is determined to have performed printing is activated by wireless communication by the BLE.

As a result of this determination, in the printer 10, when it is determined that the terminal apparatus 20 that is determined to have performed printing is activated (YES in step S37), the device control unit 11a proceeds to a process of step S38.

On the other hand, as a result of this determination, in the printer 10, when it is determined that the terminal apparatus 20 that is determined to have performed printing is not activated (NO in step S37), the device control unit 11a proceeds to a process of step S39. Details of the process of step S37 are the same as the process of step S7 in the example of FIG. 4.

Step S38

In the printer 10, the device control unit 11a determines, by wireless communication by the BLE, whether or not the function of the wireless communication unit 23 of the terminal apparatus 20 determined to have performed printing and determined to be activated is in an ON state. In this embodiment, the function of the wireless communication unit 23 is a function of wireless communication by the Wi-Fi (registered trademark).

As a result of this determination, in the printer 10, in a case where it is determined that the function of the wireless communication unit 23 of the terminal apparatus 20 determined to have performed printing and determined to be activated is in the ON state (YES in Step S38), the device control unit 11a proceeds to the process of step S40.

On the other hand, as a result of this determination, in the printer 10, in a case where the device control unit 11a determines that the function of the wireless communication unit 23 of the terminal apparatus 20 determined to have performed printing and determined to be activated is not in the ON state (that is, it is in the OFF state) (NO in Step S38), the device control unit 11a proceeds to the process of step S39.

The process of step S38 is the same as the process of step S8 in the example of FIG. 4.

Step S39

In the printer 10, the device control unit 11a enters the wireless communication stop mode and stops transmission of a packet of the direct communication connection. Then, the device control unit 11a proceeds to a process of step S41.

Here, the wireless communication stop mode is a state in which wireless communication by the wireless communication unit 13 is stopped. In this example, the wireless communication stop mode is a state in which the wireless communication relating to at least the direct communication connection is stopped. Specifically, in the direct communication connection using the Wi-Fi (registered trademark), the function of periodically transmitting a beacon by broadcast as a function of a pseudo access point is in a state of being OFF.

As In this example, in the printer 10, the function of BLE is also held in the ON state in the wireless communication stop mode.

Here, in this embodiment, when the pseudo access point of the printer 10 enters the wireless communication stop mode, the pseudo access point enters a so-called stealth state. Specifically, the pseudo access point of the printer 10 becomes a state where the pseudo access point cannot be found unless the active scan process is performed from the terminal apparatus 20 existing around the printer 10.

Step S40

In the printer 10, the device control unit 11a performs a normal operation. Then, the device control unit 11a proceeds to step S41.

Step S41

In the printer 10, the device control unit 11a determines whether or not the touch panel display 14 is operated by the user (step S41).

As a result of this determination, in the printer 10, when it is determined that the touch panel display 14 is operated by the user (YES in step S41), the device control unit 11a proceeds to the process of step S33. In this example, in this case, in the printer 10, the device control unit 11a shifts to a mode (normal operation mode) for performing a normal operation when the printer 10 is in the wireless communication stop mode.

On the other hand, as a result of this determination, in the printer 10, when it is determined that the touch panel display 14 is not operated by the user (NO in step S41), the device control unit 11a proceeds to step S42.

Step S42

In the printer 10, the device control unit 11a determines whether or not the so-called power receptacle is connected and being driven by power is established (step S42).

As a result of this determination, in the printer 10, when it is determined that the so-called power receptacle is connected and being driven by power is established (YES in step S42), the device control unit 11a proceeds to the process of step S33. In this example, in this case, in the printer 10, the device control unit 11a shifts to the mode (normal operation mode) for performing the normal operation when the printer 10 is in the wireless communication stop mode.

On the other hand, as a result of this determination, in the printer 10, when it is determined that the so-called power receptacle is not connected and being driven by power is not established (NO in step S42), the device control unit 11a proceeds to the process of step S35. In the present example, in this case, in the printer 10, the device control unit 11a shifts to the mode (normal operation mode) for performing the normal operation when the printer 10 is in the wireless communication stop mode.

Here, as a modification example of the process flow illustrated in FIG. 5, the process of step S35 may be arranged immediately before the process of step S39, instead of the process sequence illustrated in FIG. 5. Specifically, in the example illustrated in FIG. 5, when the determination result in step S34 is NO, the device control unit 11a proceeds to the process of step S36, when the determination result in step S36, in step S37, or in step S38 is NO, the device control unit 11a proceeds to step S35, when the determination result in step S35 is NO, the device control unit 11a proceeds to step S39, when the determination result in step S40 is YES, the device control unit 11a proceeds to step S40, and when the determination result in step S42 is NO, the device control unit 11a proceeds to step S36.

In the example of FIG. 5, the normal operation mode and the wireless communication stop mode are illustrated as the mode of the printer 10, but other modes may be used.

In the example of FIG. 5, although illustration of a process of ending a flow of a series of processes is omitted, for example, in a case where the power supply of the printer 10 is turned off, the process flow illustrated in FIG. 5 is ended once.

Here, any of the process relating to the Infra connection as illustrated in FIG. 4 and the process relating to the direct communication connection as illustrated in FIG. 5 may be performed, for example, or both of these processes may be performed simultaneously in parallel.

For example, in the printer 10, when the Infra connection is performed and the direct communication connection is not performed, the process relating to the Infra connection as illustrated in FIG. 4 is performed.

Further, for example, in the printer 10, when the direct communication connection is performed and the Infra connection is not performed, the process relating to the direct communication connection as illustrated in FIG. 5 is performed.

For example, when both the Infra connection and the direct communication connection are performed simultaneously in parallel in the printer 10, any of the process relating to the Infra connection as illustrated in FIG. 4 and the process relating to the direct communication connection as illustrated in FIG. 5 may be performed, or both of these processes may be performed simultaneously in parallel.

Summarization of Embodiment as Described Above

As described above, in the printing system 1 according to this embodiment, for example, in a case where the printer 10 is driven by a battery, is not wirelessly connected to the access point 30 due to the Infra connection, and the terminal apparatus 20 that has performed printing by its own apparatus (the printer 10) in the past does not exist around the printer 10, the printer 10 shifts to a state in which at least a part of the wireless communication functions (in this embodiment, functions related to wireless communication using the Wi-Fi (registered trademark)) are in an OFF state.

In the printing system 1 according to this embodiment, for example, in a case where the printer 10 is driven by the battery, a wireless connection request is not received from the terminal apparatus 20 by the direct communication connection, and the terminal apparatus 20 that has performed printing by its own apparatus (the printer 10) in the past does not exist around the printer 10, the printer 10 shifts to a state in which at least a part of the wireless communication functions (in this embodiment, a function related to wireless communication using the Wi-Fi (registered trademark)) is in an OFF state.

As another example, when the printer 10 is driven by the battery and is not wirelessly connected to the access point 30 due to the Infra connection, the printer 10 may shift to a state in which at least a part of the wireless communication functions (in this embodiment, functions related to wireless communication using the Wi-Fi (registered trademark)) is in an OFF state.

In a case where such a configuration is adopted, for example, in the process flow illustrated in FIG. 4, the processes of step S5 to step S8 are excluded and in the printer 10, when it is determined, in step S4, that the Infra connection cannot be performed (NO in step S4), the device control unit 11a proceeds to the step of step S9.

As another example, when the printer 10 is driven by the battery and the wireless connection request is not received from the terminal apparatus 20 by the direct communication connection, the printer 10 may shift to a state in which at least a part of the wireless communication functions (in this embodiment, functions related to wireless communication using the Wi-Fi (registered trademark)) are in an OFF state.

In a case where such a configuration is adopted, for example, in the process flow illustrated in FIG. 5, the processes of step S36 to step S38 are excluded and in the printer 10, when it is determined, in the process of step S35, that the terminal apparatus 20 has not come into connection with the printer 10 (NO in step S35), the device control unit 11a proceeds to the process of step S39.

As another example, when the printer 10 is driven by the battery and the terminal apparatus 20 that has performed printing by its own apparatus (the printer 10) in the past does not exist around the printer 10, the printer 10 may shift to a state in which at least part of the wireless communication functions (in this embodiment, functions related to wireless communication using the Wi-Fi (registered trademark)) are turned off.

In a case where such a configuration is adopted, for example, in the process flow illustrated in FIG. 4, the process of step S4 is excluded and in the printer 10, when the device control unit 11a, in the process of step S3, determines that the printer 10 is not driven by power (NO in step S3), the device control unit 11a shifts to the process of step S5 and in the printer 10, when it is determined, in the process of step S12, that the so-called power receptacle is not connected and the printer 10 is not driven by power (NO in step S12), the device control unit 11a proceeds to the process of step S5.

Alternatively, in a case where such a configuration is adopted, for example, in the process flow illustrated in FIG. 5, the process of step S35 is excluded and in the printer 10, when it is determined, in the process of step S34, that the printer 10 is not driven by power (NO in step S34), the device control unit 11a proceeds to the process of step S36, and in the printer 10, when it is determined, in the process of step S42, that the so-called power receptacle is not connected and the printer 10 is not driven by power (NO in step S42), the device control unit 11a proceeds to the process of step S36.

For example, even when the terminal apparatus 20 that has performed printing by its own apparatus (the printer 10) in the past exists around the printer 10, when the terminal apparatus 20 is not activated, the printer 10 may shift to a state in which at least a part of the wireless communication functions (in this embodiment, functions related to wireless communication using the Wi-Fi (registered trademark)) are in an OFF state.

Even when the terminal apparatus 20 that has performed printing by its own apparatus (the printer 10) in the past exists around the printer 10 and the terminal apparatus 20 is activated, when the predetermined wireless communication function of the terminal apparatus 20 (in this embodiment, the function of Wi-Fi (registered trademark)) is OFF, the printer may shift to a state in which at least a part of the wireless communication functions (in this embodiment, functions related to wireless communication using the Wi-Fi (registered trademark)) are in an OFF state.

With this configuration as described above, in the printing system 1 according to the present embodiment, it is possible to save power in the printer 10.

In the printing system 1 according to this embodiment, when a predetermined condition is satisfied in the printer 10, it is possible to suppress wasteful consumption of power by shifting to a state where a wasteful communication process is stopped. With this configuration, efficiency can be improved in the printer 10. For example, it is possible to extend the operation time in the case of the same power consumption, or to reduce power consumption in the same operation time.

In this embodiment, a method of shifting to a state of stopping a wasteful communication process is used in the printer 10 instead of a method of lowering transmission power of radio waves for the wasteful communication process, and thus efficiency can be further improved. Both of these methods may be used in the printer 10.

For example, in the printer 10, when the printer 10 is driven by a battery, the user needs to pay attention to a remaining amount of the battery. However, in the recent printer 10, a wireless function is installed, and power may be consumed by the wireless function even when the operation is not particularly performed as seen from the user. Accordingly, in this embodiment, unnecessary power consumption can be suppressed by being shifted to a state where the wasteful communication process is stopped when the predetermined condition is satisfied in the printer 10.

Here, in this embodiment, a case where the BLE communication and the Wi-Fi (registered trademark) communication are used is illustrated, but other wireless communication methods may be used. For example, instead of the BLE communication, other wireless communication methods capable of directly performing wireless communication between the information processing apparatus (in the embodiment, the printer 10) and the terminal apparatus (in the embodiment, the terminal apparatus 20) may be used. For example, instead of the Infra connection communication of Wi-Fi (registered trademark), another wireless communication method capable of indirectly performing wireless communication between the information processing apparatus (in the embodiment, the printer 10) and the terminal apparatus (in the embodiment, the terminal apparatus 20) may be used. For example, instead of the direct connection communication of Wi-Fi (registered trademark), another wireless communication method capable of directly performing wireless communication between the information processing apparatus (in the embodiment, the printer 10) and the terminal apparatus (in the embodiment, the terminal apparatus 20) may be used.

As The information processing apparatus may be called by another name such as an electronic apparatus, for example.

Further, in this embodiment, a case where the printer 10 is used as the information processing apparatus is illustrated, but technology similar to that in this embodiment may be applied to various other apparatuses.

Configuration Example 1

As a configuration example, there is provided an information processing apparatus (in this embodiment, the printer 10) including a first wireless communication unit (in this embodiment, the BLE communication unit 12) that establishes first wireless communication (in this embodiment, the first wireless communication 110) with a terminal apparatus (in this embodiment, the terminal apparatus 20) by a first wireless communication method (in this embodiment, wireless communication method using BLE), a second wireless communication unit (in this embodiment, the wireless communication unit 13) that establishes, by a second wireless communication method, third wireless communication (in this embodiment, the third wireless communication 130) with an access point (in this embodiment, the access point 30) of a wireless communication network that establishes second wireless communication (in this embodiment, the second wireless communication 120) with the terminal apparatus by the second wireless communication method (in this embodiment, wireless communication method using Wi-Fi (registered trademark)), and a control unit (in this embodiment, the device control unit 11a) that determines whether or not driving power is supplied from a battery, determines whether or not the third wireless communication with the access point is established by the second wireless communication method, and, when it is determined that a condition that the driving power is supplied from the battery and the third wireless communication with the access point is not established by the second wireless communication method is satisfied, shifts from an execution mode (in this embodiment, the normal operation mode) in which a predetermined wireless connection process (in this embodiment, the process of searching for the access point 30 by the scan process) in the second wireless communication method is executed to a non-execution mode (in this embodiment, the wireless communication stop mode) in which the predetermined wireless connection process is not executed.

Configuration Example 2

As another configuration example, there is provided an information processing apparatus (in this embodiment, the printer 10) apparatus including a first wireless communication unit (in this embodiment, the BLE communication unit 12) that establishes first wireless communication (in this embodiment, the first wireless communication 110) with a terminal apparatus (in this embodiment, the terminal apparatus 20) by a first wireless communication method (in this embodiment, wireless communication method using BLE), a second wireless communication unit (in this embodiment, the wireless communication unit 13) that establishes fourth wireless communication (in this embodiment, the fourth wireless communication 140) with the terminal apparatus by a second wireless communication method (in this embodiment, wireless communication method using Wi-Fi (registered trademark)), and a control unit (in this embodiment, the device control unit 11a) that determines whether or not driving power is supplied from a battery, determines whether or not a connection request for the fourth wireless communication is received from the terminal apparatus, and, when it is determined that a condition that the driving power is supplied from the battery and the connection request for the fourth wireless communication is not received from the terminal apparatus is satisfied, shifts from an execution mode (in this embodiment, the normal operation mode) in which a predetermined wireless connection process (in this embodiment, a process of wirelessly transmitting a beacon by a function of a pseudo access point) is executed in the second wireless communication method to a non-execution mode (in this embodiment, the wireless communication stop mode) in which the predetermined wireless connection process is not executed.

Configuration Example 3

In the information processing apparatus according to the configuration example 1 or the configuration example 2, the information processing apparatus includes a storing unit (in this embodiment, the memory of the printer 10) that stores identification information (in this embodiment, information of the MAC address) of the terminal apparatus connected in a wireless manner by the second wireless communication method in the past, and the control unit determines whether or not the terminal apparatus connected to the information processing apparatus in a wireless manner by the second wireless communication method in the past exists around the information processing apparatus based on the identification information of the terminal apparatus stored in the storing unit and, when it is determined that the condition is satisfied and a condition that the terminal apparatus connected in a wireless manner by the second wireless communication method in the past does not exist around the information processing apparatus is satisfied, shifts to the non-execution mode.

Configuration Example 4

As a configuration example, there is provided an information processing apparatus (in this embodiment, printer 10) including a first wireless communication unit (in this embodiment, the BLE communication unit 12) that establishes first wireless communication (in this embodiment, the first wireless communication 110) with a terminal apparatus (in this embodiment, the terminal apparatus 20) by a first wireless communication method (in this embodiment, wireless communication method using BLE), a second wireless communication unit (in this embodiment, the wireless communication unit 13) that performs at least one of establishing, by a second wireless communication method, third wireless communication (in this embodiment, the third wireless communication 130) with an access point (in this embodiment, the access point 30) of a wireless communication network that establishes second wireless communication (in this embodiment, the second wireless communication 120) with the terminal apparatus by the second wireless communication method (in this embodiment, wireless communication method using Wi-Fi (registered trademark)) and establishing fourth wireless communication (in this embodiment, the fourth wireless communication 140) with the terminal apparatus by the second wireless communication method, a storing unit that stores identification information of the terminal apparatus connected in a wireless manner by the second wireless communication method in the past, and a control unit (in this embodiment, the device control unit 11a) that determines whether or not driving power is supplied from a battery, determines whether or not the terminal apparatus connected to the information processing apparatus in a wireless manner by the second wireless communication method in the past exists around the information processing apparatus based on the identification information of the terminal apparatus stored in the storing unit and, when it is determined that a condition that the driving power is supplied from the battery and the terminal apparatus connected in a wireless manner by the second wireless communication method in the past does not exist around the information processing apparatus is satisfied, shifts from an execution mode (in this embodiment, the normal operation mode) in which a predetermined wireless connection process (in this embodiment, at least one of a process of searching for the access point 30 by the scan process and a process of wirelessly transmitting a beacon by a function of a pseudo access point) is executed in the second wireless communication method to a non-execution mode (in this embodiment, the wireless communication stop mode) in which the predetermined wireless connection process is not executed.

Configuration Example 5

In the information processing apparatus according to the configuration example 3 or the configuration example 4, the control unit determines whether or not the terminal apparatus is activated when it is determined that the condition that the terminal apparatus connected in a wireless manner by the second wireless communication method in the past exists around the information processing apparatus is satisfied, and shifts to the non-execution mode when it is determined that the condition that the terminal apparatus is not activated is satisfied.

Configuration Example 6

In the information processing apparatus according to the configuration example 5, the control unit determines whether a predetermined wireless communication function (in this embodiment, wireless communication function using Wi-Fi (registered trademark)) of the second wireless communication method in the terminal apparatus is ON or OFF when it is determined that the condition that the terminal apparatus is not activated is satisfied, and the control unit shifts to the non-execution mode when it is determined that the condition that the predetermined wireless communication function of the second wireless communication method in the terminal apparatus is OFF is satisfied.

A program for realizing the function of any component in any apparatus such as the printer 10, the terminal apparatus 20 or the access point 30 described above may be recorded (stored) in a computer-readable recording medium (storage medium), and the program may be read into a computer system to be executed. The "computer system" referred to here includes an operating system (OS) or hardware such as a peripheral device. The "computer-readable recording medium" refers to a storage medium such as a flexible disk, a magneto-optical disk, a ROM, a portable medium such as a compact disc (CD)-ROM, or a storage device such as a hard disk built in the computer system. Furthermore, the "computer-readable recording medium" includes those that hold a program for a certain period of time, such as a volatile memory (RAM) inside a computer system serving as a server or a client when the program is transmitted through a network such as the Internet or a communication line such as a telephone line.

The program described above may be transmitted from a computer system in which the program is stored in a storage device or the like to another computer system through a transmission medium or by transmission wave in the transmission medium. Here, the "transmission medium" for transmitting the program means a medium having a function of transmitting information such as a network (communication network) such as the Internet or a communication line (communication line) such as a telephone line. The program described above may be for realizing part of the functions described above.

Further, the program described above may be a so-called difference file (differential program) which can realize the functions described above by a combination with a program already recorded in the computer system.

The function of any configuration unit in any device such as the printer 10, the terminal apparatus 20, and the access point 30 described above may be realized by a processor (a processor including hardware). For example, each process in this embodiment may be realized by a processor that operates based on information such as a program and a computer readable recording medium that stores information such as the program. Here, for example, the function of each unit may be realized by individual hardware, or the function of each unit may be realized by integrated hardware. For example, the processor may include hardware, and the hardware may include at least one of a circuit for processing a digital signal and a circuit for processing an analog signal. For example, the processor may be configured by one or a plurality of circuit devices mounted on a circuit board, or with one or both of one or a plurality of circuit elements. An integrated circuit (IC) or the like may be used as the circuit device, and a resistor, a capacitor, or the like may be used as the circuit element.

Here, the processor may be, for example, a CPU. However, the processor is not limited to the CPU, and various processors such as a graphics processing unit (GPU), a digital signal processor (DSP), or the like may be used, for example. The processor may be a hardware circuit including an application specific integrated circuit (ASIC), for example. The processor may be configured by, for example, a plurality of CPUs, or may be configured by a hardware circuit including a plurality of ASICs. For example, the processor may be configured by a combination of a plurality of CPUs and a hardware circuit including a plurality of ASICs. In addition, the processor may include, for example, one or more of an amplifier circuit or a filter circuit for processing an analog signal Although the embodiment of the present disclosure has been described as above in detail with reference to the drawings, the specific configuration is not limited to this embodiment, and designs and the like within the scope not deviating from the gist of the present disclosure are included.

What is claimed is:
1. An information processing apparatus comprising:
a first wireless communication unit that is configured to establish first wireless communication with one or more terminal apparatus by a first wireless communication method, the first wireless communication receiving information related to the one or more terminal apparatus;
a second wireless communication unit that is configured to establish, by a second wireless communication method, third wireless communication with an access point of a wireless communication network that establishes second wireless communication with the one or more terminal apparatus by the second wireless communication method; and
a control unit that
determines (1) whether or not driving power is supplied from a battery, and (2) whether or not at least one of the one or more terminal apparatus is nearby based on information received from the first wireless communication established or no first wireless communication established, and
when it is determined (1) that the driving power is supplied from the battery and (2) that none of the one or more terminal apparatus is nearby, shifts from an execution mode in which a predetermined wireless connection process in the second wireless communication method is executed to a non-execution mode in which the predetermined wireless connection process is not executed.

2. The information processing apparatus according to claim 1, further comprising:
a storing unit that stores identification information of the one or more terminal apparatus that have been connected to the information processing apparatus in a wireless manner by the second wireless communication method in the past, wherein
the control unit
determines whether or not at least one of the one or more terminal apparatus exists around the information processing apparatus based on the identification information of the one or more terminal apparatus stored in the storing unit and the information received via the first communication, and
when it is determined that none of the one or more terminal apparatus exists around the information processing apparatus, shifts to the non-execution mode.

3. The information processing apparatus according to claim 2, wherein
the control unit determines whether or not the at least one terminal apparatus is activated when it is determined that the at least one terminal apparatus connected to the information processing apparatus in a wireless manner by the second wireless communication method in the past exists around the information processing apparatus, and shifts to the non-execution mode when it is determined that a condition that the at least one terminal apparatus is not activated is satisfied.

4. The information processing apparatus according to claim 3, wherein
the control unit determines whether a predetermined wireless communication function of the second wireless communication method in the at least one terminal apparatus is ON or OFF when it is determined that the condition that the at least one terminal apparatus is not activated is satisfied, and shifts to the non-execution mode when it is determined that the condition that the predetermined wireless communication function of the second wireless communication method in the at least one terminal apparatus is OFF is satisfied.

5. The information processing apparatus according to claim 1, wherein the control unit further:
determines whether or not the third wireless communication with the access point is established by the second wireless communication method; and
when it is determined that the third wireless communication with the access point is not established by the second wireless communication method, shifts from the execution mode, in which a predetermined wireless connection process in the second wireless communication method is executed, to the non-execution mode, in which the predetermined wireless connection process is not executed.

6. An information processing apparatus comprising:
a first wireless communication unit that is configured to establish first wireless communication with one or more terminal apparatus by a first wireless communication method, the first wireless communication containing information related to the one or more terminal apparatus;
a second wireless communication unit that is configured to establish fourth wireless communication with the one or more terminal apparatus by a second wireless communication method; and
a control unit that
determines (1) whether or not driving power is supplied from a battery, and (2) whether or not at least one of the one or more terminal apparatus is nearby based on information received from the first wireless communication established or no first wireless communication established, and
when it is determined (1) that the driving power is supplied from the battery, and (2) that none of the one or more terminal apparatus is nearby, shifts from an execution mode in which a predetermined wireless connection process in the second wireless communication method is executed to a non-execution mode in which the predetermined wireless connection process is not executed.

7. The information processing apparatus according to claim 6, wherein the control unit further:
determines whether or not a connection request for the fourth wireless communication is received from the terminal apparatus; and
when it is determined that the connection request for the fourth wireless communication is not received from the terminal apparatus, shifts from an execution mode, in which a predetermined wireless connection process in the second wireless communication method is executed, to a non-execution mode, in which the predetermined wireless connection process is not executed.

8. An information processing apparatus comprising:
a first wireless communication unit that is configured to establish first wireless communication with one or more terminal apparatus by a first wireless communication method, the first wireless communication receiving information related to the one or more terminal apparatus;
a second wireless communication unit that performs at least one of establishing, by a second wireless communication method, third wireless communication with an access point of a wireless communication network that establishes second wireless communication with the one or more terminal apparatus by the second wireless communication method and establishing fourth wireless communication with the one or more terminal apparatus by the second wireless communication method;
a storing unit that stores identification information of the one or more terminal apparatus that have been connected to the information processing apparatus in a wireless manner by the second wireless communication method in the past; and
a control unit that
determines (1) whether or not driving power is supplied from a battery, and (2) whether or not at least one of the one or more terminal apparatus exists around the information processing apparatus based on the identification information of the at least one terminal apparatus stored in the storing unit and information received from the first wireless communication, and
when it is determined (1) that the driving power is supplied from the battery and (2) that none of the one or more terminal apparatus exists around the information processing apparatus, shifts from an execution mode in which a predetermined wireless connection process is executed in the second wireless communication method to a non-execution mode in which the predetermined wireless connection process is not executed.

9. The information processing apparatus according to claim 8, wherein the control unit further:
- determines whether or not at least one of the one or more terminal apparatus that has been connected to the information processing apparatus in a wireless manner by the second wireless communication method in the past exits; and
- when it is determined that the terminal apparatus that has been connected to the information processing apparatus in a wireless manner by the second communication method in the past does not exist, shifts from an execution mode, in which a predetermined wireless connection process is executed in the second wireless communication method, to a non-execution mode, in which the predetermined wireless connection process is not executed.

\* \* \* \* \*